United States Patent [19]

Stromberg

[11] Patent Number: 4,566,168
[45] Date of Patent: Jan. 28, 1986

[54] QUICK CONNECT ADAPTER
[75] Inventor: James L. Stromberg, Duncan, Okla.
[73] Assignee: Halliburton Company, Duncan, Okla.
[21] Appl. No.: 690,016
[22] Filed: Jan. 9, 1985
[51] Int. Cl.[4] .................. B21D 39/00; F16L 39/00
[52] U.S. Cl. .................................. 29/517; 285/319
[58] Field of Search .................. 285/319, 322, 323; 29/517

[56] References Cited

U.S. PATENT DOCUMENTS

| | | |
|---|---|---|
| 1,016,620 | 2/1912 | Gapp . |
| 1,098,620 | 6/1914 | Gillar . |
| 1,662,311 | 3/1928 | Hamer . |
| 1,866,726 | 7/1932 | Santiago . |
| 1,875,266 | 8/1932 | Santiago . |
| 2,498,915 | 2/1950 | Espegren . |
| 2,509,118 | 5/1950 | Warren . |
| 2,951,274 | 9/1960 | Elsner . |
| 3,096,999 | 7/1963 | Ahlstone et al. . |
| 3,113,792 | 12/1963 | Brown . |
| 3,291,442 | 12/1966 | Cranage . |
| 3,339,947 | 9/1967 | Maisey . |
| 3,545,542 | 12/1970 | Scott . |
| 3,616,850 | 11/1971 | Scott . |
| 3,628,812 | 12/1971 | Larralde . |
| 3,912,009 | 10/1975 | Davis .................. 285/319 |
| 4,138,144 | 2/1979 | Pierce, Jr. . |
| 4,153,278 | 5/1979 | Ahlstone . |
| 4,209,193 | 6/1980 | Ahlstone . |
| 4,219,226 | 8/1980 | Kappenhagen . |
| 4,246,967 | 1/1981 | Harris . |
| 4,337,971 | 7/1982 | Kendrick . |
| 4,373,753 | 2/1983 | Ayers et al. .................. 285/319 |

FOREIGN PATENT DOCUMENTS 1314816  4/1973  United Kingdom .

OTHER PUBLICATIONS

Exhibit A-Drawing.
Apparatus illustrated in FIGS. 1-7, of U.S. patent application Ser. No. 296,325.
Apparatus illustrated in U.S. patent application Ser. No. 374,869.

Primary Examiner—Howard N. Goldberg
Assistant Examiner—Steven Nichols
Attorney, Agent, or Firm—Lucian Wayne Beavers; James R. Duzan; Thomas R. Weaver

[57] ABSTRACT

A coupling apparatus for connection to a cylindrical member having a radially outward extending shoulder includes a body member. A collet assembly including a plurality of collet fingers is disposed around the body member and each of the collet fingers includes a radially inward extending flange adapted to engage a lower surface of the shoulder of the cylindrical member. An actuating sleeve operably associated with the collet assembly moves the flanges of the collet fingers between a radially expanded open position and a radially contracted closed position. An annular seal is provided between the body member and the cylindrical member. An adjustable collet positioning apparatus is operably associated with the body member and the collet assembly for adjusting a longitudinal position of the flanges of the collet fingers relative to the body member.

20 Claims, 6 Drawing Figures

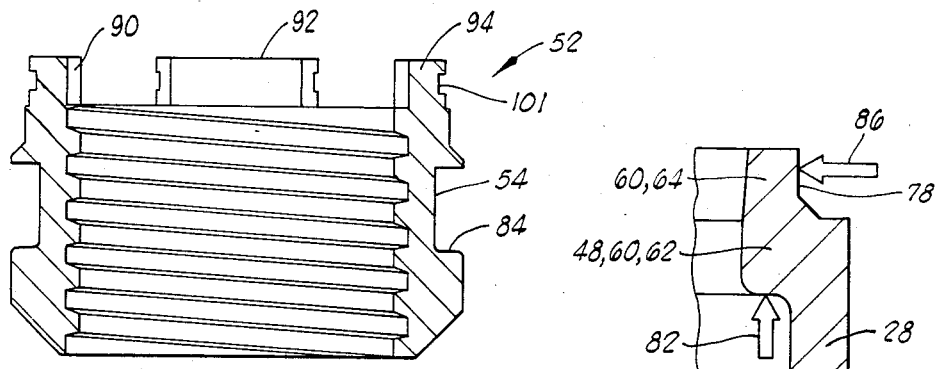
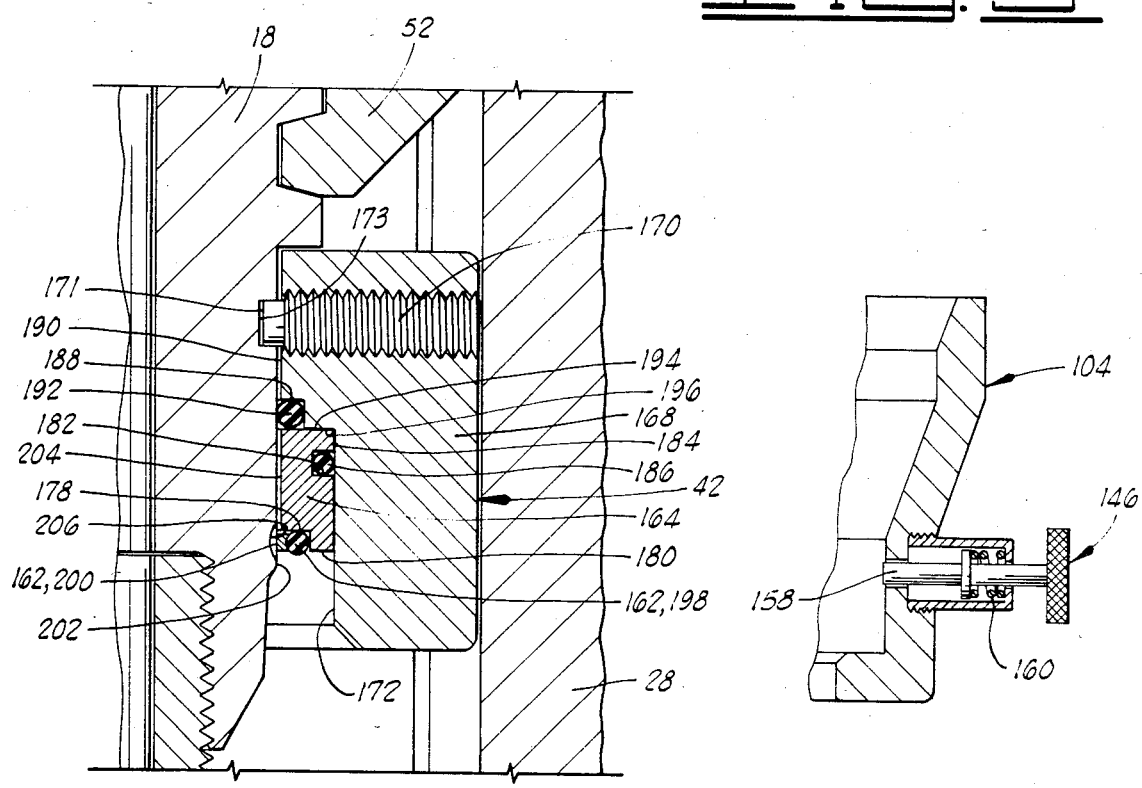

QUICK CONNECT ADAPTER

BACKGROUND OF THE INVENTION

1. Field Of The Invention

This invention relates generally to couplings constructed to be quickly connected to a cylindrical member, and more particularly, but not by way of limitation, to a coupling for quickly connecting fracturing equipment, a plug container or the like to a casing of an oil or gas well.

2. Description Of The Prior Art

The most common manner in which fracturing equipment, cement plug containers, or similar equipment is connected to the upper end of a well casing is by use of a threaded nipple which has a threaded lower end compatible with an internal thread of a conventional casing collar. This nipple and the associated equipment are attached to the well casing by threading the threaded nipple into the threaded casing collar.

Numerous problems have been encountered when utilizing threaded nipples to connect such equipment to a well casing.

Often the casing stands as much as fifteen feet above the floor of the drilling rig thus creating a hazard to personnel who attempt to work at that height to perform the threading operation.

Also, due to the difficulty of the threading operation, the use of a threaded nipple is susceptible to cross-threading which can lead to blowouts.

Another problem encountered with using threaded nipples is the difficulty in achieving the recommended torque values for makeup of the threaded connection. Casing threads are designed to be made up with extremely high torques. For example, optimum recommended torque values for 5½-inch, eight round, long thread casing range from 2400 ft-lbs. to 8900 ft-lbs. depending on the weight and grade of the casing. Since the casing string joints themselves are made up with power tongs on the drilling rig, recommended torque values can easily be achieved when assembling the casing itself. However, when rigging up for fracturing services or the like, power tongs are normally neither available nor compatible with the equipment being attached to the well casing. Consequently, change-over adapters for fracturing equipment must be made up by hand with chain tongs and it often is very difficult to achieve the recommended torque values for the threaded connection.

These problems with the use of threaded nipples for connecting equipment to a well casing have led to numerous attempts to construct a clamp-on type of connection for attachment to the well casing.

One such attempt is shown in my pending U.S. patent application Ser. No. 296,325 filed Aug. 26, 1981, entitled Quick Connect Coupler which itself is a continuation-in-part of my prior U.S. patent application Ser. No. 238,802 filed Feb. 27, 1981, and now abandoned. Although my co-pending application is not itself a prior art reference to the present application, apparatus substantially like that illustrated in FIGS. 1-7 of my co-pending application has been commercially used by the assignee of the present invention more than one year prior to the filing date of the present application, and thus the structure illustrated and described with regard to FIGS. 1-7 of my co-pending application does constitute prior art with regard to the present application.

The apparatus of FIGS. 1-7 of application Ser. No. 296,325 was particularly disclosed with regard to the connection of a cement plug container to the top of a well casing having a threaded collar at the upper end of the casing. That coupling included a body member and annular seal means for sealing between the body member and the casing collar. A plurality of collet sections were disposed around the body member and each of the collet sections included an upper end connected to the body member and a lower end adapted for engagement with a lower end surface of the casing collar. An outer sleeve was slidably disposed about the plurality of collet sections and was slidable relative to the collet sections between an open position wherein the lower ends of the collet section could receive the casing collar therebetween, and a closed position wherein the body member was sealingly coupled to the casing collar.

In the coupling member of application Ser. No. 296,325, the compressional seal between the casing collar and the body member was achieved through a cam action created by an upward force on the actuating sleeve. Thus it was necessary that the actuating sleeve be raised by something other than manual power in order to provide the necessary force.

Also, the apparatus of application Ser. No. 296,325 did not provide for any adjustment in order to accommodate differing lengths of casing collars, but instead provided only for accommodation of casing collars having a length within a relatively narrow band. This accommodation was provided due to longitudinal compressibility of the seal between the body member and the casing collar.

Another prior art device for coupling well equipment to a well casing is disclosed in pending U.S. patent application Ser. No. 374,869 of Brisco filed May 4, 1982. That application is entitled Coupling Device, and is assigned to the assignee of the present invention.

The Brisco device used a locking collar having first and second pivotally connected arcuate collar portions to engage the lower surface of the casing collar. The Brisco device was adjustable to accommodate any length of casing collar, and this adjustability was provided by the use of a cylindrical adjusting nut having an internally threaded upper end threadedly engaged with a threaded outer surface of a body member of the device to be attached to the casing. The cylindrical adjusting nut was connected to the locking collar so as to move the locking collar relative to the body member.

The upper end of the casing collar in the Brisco device was closely received within a bore of the body member. A main seal means was disposed in the bore of the body member and included an outer seal against the bore of the body and a lower main seal for sealing against the upper end of the casing collar. This main seal was hydraulically biased against the casing collar.

One problem with the Brisco device is that the locking collar, which has a C-shaped cross section, carries the loads between the body member and the casing collar substantially through bending type loading of the C-shaped collar. The C-shaped collar attaching device of Brisco creates certain difficulties in design since it is more difficult to analyze through conventional design techniques, and also it is more susceptible to failure due to surface imperfections and the like than is a device which carries the loading primarily through tension.

Thus, although the prior art has recognized the general problem addressed by the present invention, namely that of providing a reliable quick connect coupling for attaching well equipment to a well casing having a threaded casing collar at the upper end thereof, there is still a need for a more reliable device which also has the flexibility of accommodating casing collars of different lengths.

SUMMARY OF THE INVENTION

The present invention provides a quick connect adapter providing a number of improvements over either the apparatus illustrated in FIGS. 1-7 of my copending application Ser. No. 296,325 or the apparatus of pending Brisco application Ser. No. 374,869.

The coupling apparatus of the present invention provides a device for connection to a cylindrical member having a radially outward extending shoulder, such as a well casing having a threaded casing collar attached to the upper end thereof.

The coupling apparatus includes a body member and a collet means including a plurality of collet fingers disposed around the body member. Each of the collet fingers includes a radially inward extending flange adapted to engage a lower surface of the casing collar.

An actuating means, including an actuating sleeve, is operably associated with the collet means for moving the flanges of the collet fingers between a radially expanded open position and a radially contracted closed position. An annular seal means is provided for sealing between the body member and the casing collar.

Adjustable collet positioning means are operably associated with the body member and the collet means, for adjusting a longitudinal position of the flanges of the collet fingers relative to the body member.

Each of the collet fingers has a first end which is pivotally connected to the adjustable collet positioning means so that each of the collet fingers may pivot relative to the body member about a pivotal axis transverse to a longitudinal axis of the body member. Thus, the collet fingers of the collet means of the present invention move to an open position at their lower ends by pivoting about their upper ends.

With the apparatus of the present invention, the lower ends of the collet fingers are moved between their open and closed positions by manually moving an actuating sleeve relative to the collet fingers. The actuating sleeve serves only to open and close the collet fingers, and does not have any functions with regard to the sealing action for sealing the casing collar against the annular seal.

That sealing action is accomplished through the use of a threaded adjusting nut which adjusts the distance between the seal and the flanges of the collet fingers to accommodate different lengths of casing collars and to provide the compression of the annular seal against the casing collar.

Additionally, the annular seal is hydraulically biased toward the casing collar so that a seal is maintained even when the collet fingers stretch longitudinally as they are loaded by high internal pressures.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is a sectioned elevation view of the adjusting nut of the apparatus of FIGS. 1 and 2.

FIG. 4 is an enlarged elevation sectioned view of the annular seal means and associated structure of the apparatus of FIGS. 1 and 2.

FIG. 5 is a schematic illustration of the forces acting on the upper end of one of the collet fingers.

FIG. 6 is a schematic sectioned elevation view of the latch means of the apparatus of FIG. 1 as taken along line 6—6 of FIG. 1.

DETAILED DESCRIPTION OF THE PREFERRED EMBODIMENTS

Figure 1:
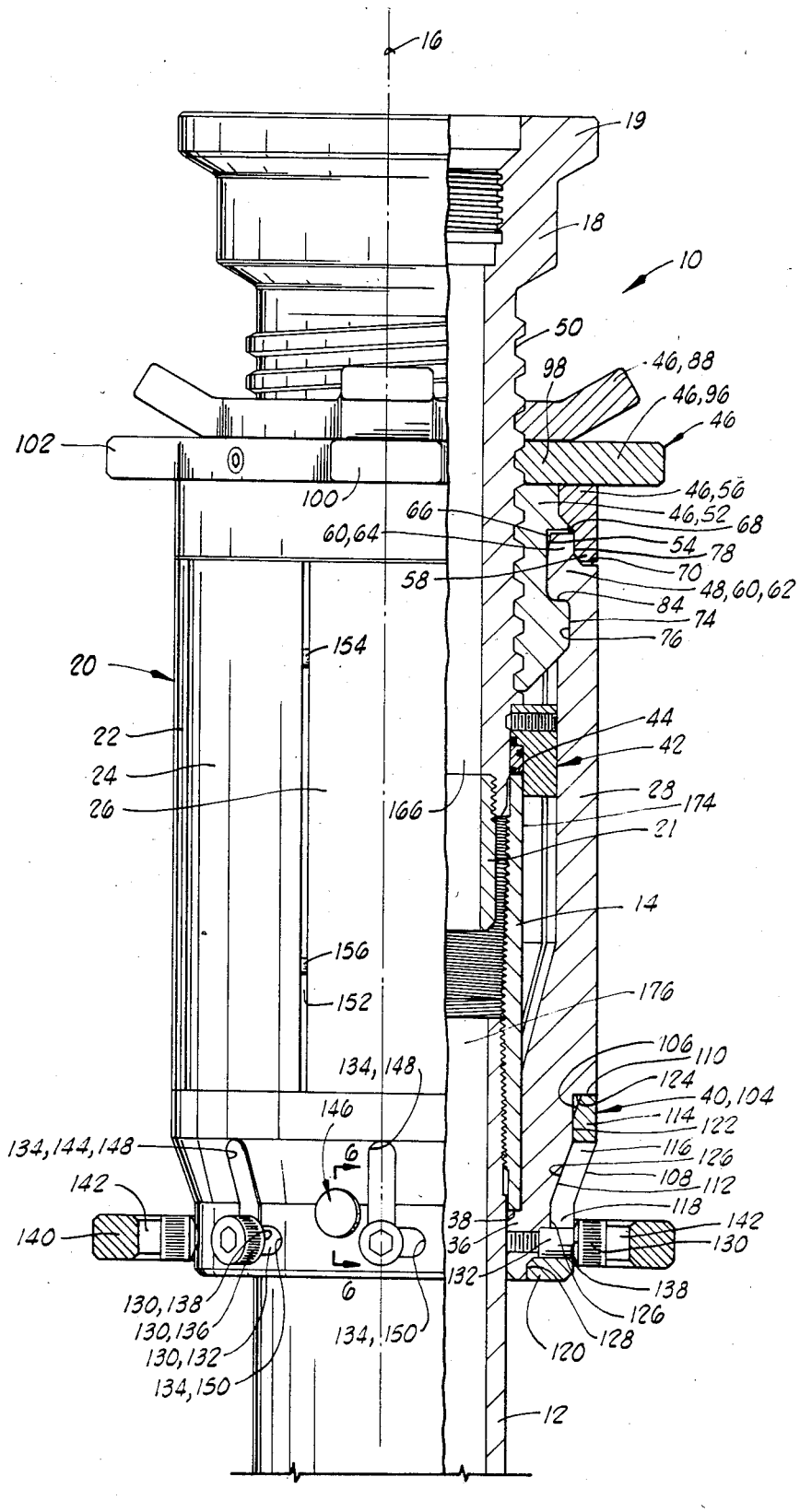
FIG. 1 is an elevation partly sectioned view of the coupling apparatus of the present invention as attached to a well casing and casing collar. The coupling apparatus is shown in its closed position in FIG. 1.

Referring now to the drawings, and particularly to FIG. 1, the coupling apparatus of the present invention is shown and generally designated by the numeral 10. The apparatus 10 is illustrated in FIG. 1 in a closed position connected to a well casing 12 having a threaded casing collar 14 connected to its upper end.

As will be appreciated from a reading of the following description of the manner of operation of the coupling apparatus 10, the coupling apparatus 10 is not necessarily utilized in a vertical position, although it is generally so oriented with regard to connecting equipment to a well casing.

For purposes of generally defining the structure of the invention, the casing 12 may be referred to as a cylindrical member which includes a radially outward extending shoulder defined by the casing collar 14. Descriptions of radially inward and outward extending structure refer to radially inward and outward as defined from a longitudinal axis 16 of the casing 12. To refer to dimensions and directions parallel to the longitudinal axis 16 of casing 12, the reference to longitudinally outward directions refers to directions parallel to the longitudinal axis of the casing 12 and directed away from the casing 12, so that in FIGS. 1 and 2 a reference to a longitudinally outward facing surface would be the equivalent of a reference to an upward facing surface. Similarly, longitudinally inward refers to a downward facing surface or a downward direction. The remainder of this disclosure will refer generally to upward and downward directions for ease of description, but it is understood that the terms "longitudinally outward" and "longitudinally inward" may be substituted for the terms "upward" and "downward", respectively.

The coupling apparatus 10 includes a body member 18 which, in the particular embodiment illustrated, has a upper flange 19 for connection of conventional fracturing equipment (not shown) such as a fracturing valve, fracturing head and the like utilized in oil or gas well fracturing operations. The body member 18 can be constructed for ease of connection of whatever particular equipment is desired to be connected to the well casing 12. For example, the body member 18 could be a portion of a cement plug container such as that described in my pending application Ser. No. 296,325.

The body member 18 has a cylindrical thread protector 21 attached to a lower end thereof and concentrically received within the upper end of casing collar 14 to protect the threads of casing collar 14 against damage due to physical impact from materials which pass through the body member 18.

A collet means 20 includes a plurality of collet fingers 22-34 which are disposed circumferentially around the body member 18. Each of the collet fingers 22-34 is similarly constructed and the details of construction will only be described for representative collet finger 28.

Collet finger 28 includes a radially inward extending flange 36 on its lower end adapted to engage a downward facing surface 38 of casing collar 14.

Figure 2:
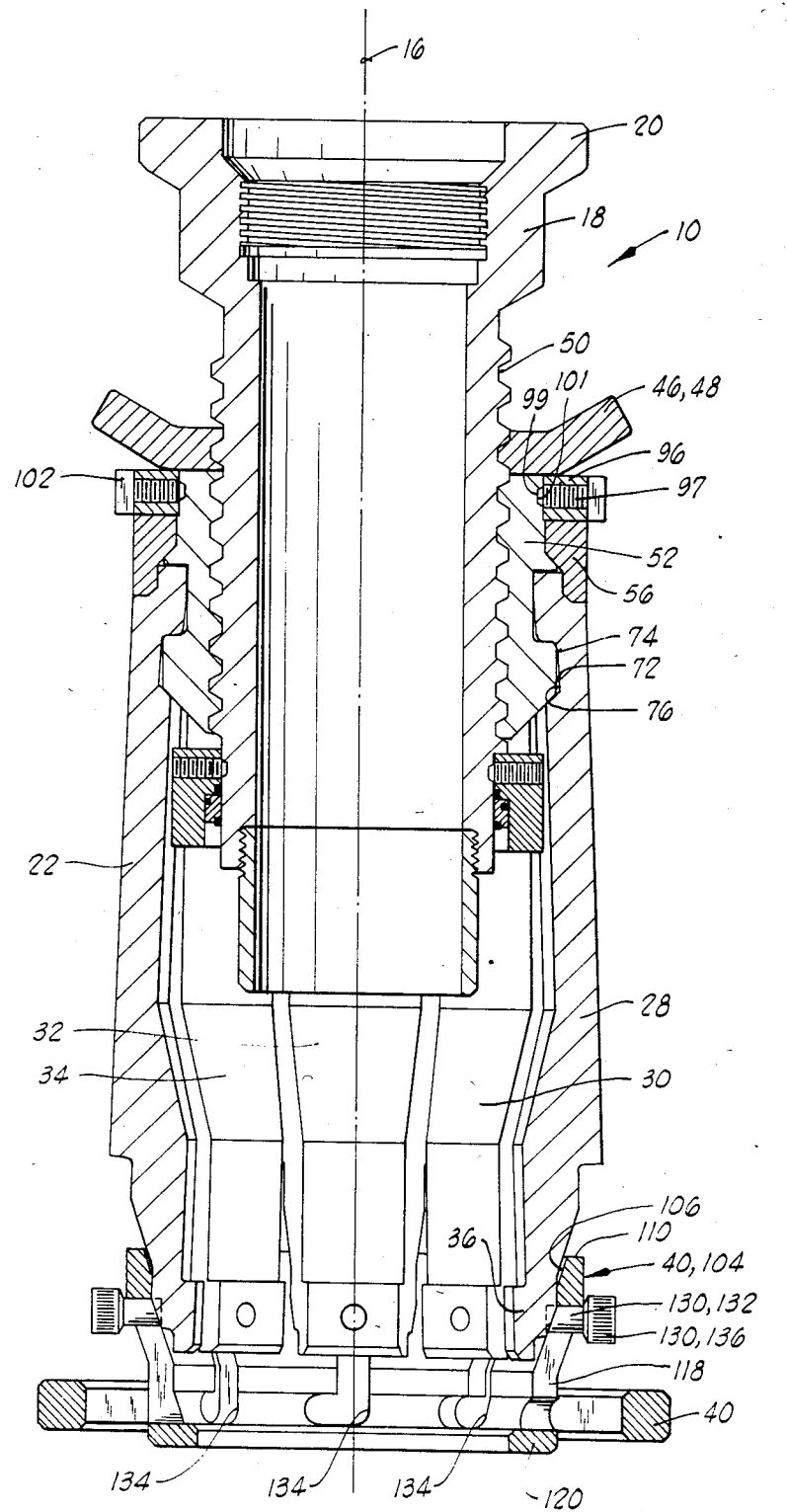
FIG. 2 shows the coupling apparatus of FIG. 1 in full elevation sectioned view in its open position.

An actuating means 40 is operably associated with the collet fingers 22-34 of collet means 20 for moving the flanges such as 36 of the collet fingers 22-34 between a radially expanded open position as illustrated in FIG. 2 and a radially contracted closed position as illustrated in FIG. 1.

An annular seal means generally designated by the numeral 42 is provided for sealing between the body member 18 and an upper end surface 44 of casing collar 14.

An adjustable collet positioning means generally designated by the numeral 46 is operably associated with the body member 18 and the collet means 20 for adjusting a longitudinal position of the flanges such as 36 of collet fingers 22-34 relative to the body member 18.

Each of the collet fingers such as collet finger 28 has an upper first end 48 pivotally connected to the adjustable collet positioning means 46 so that each of the collet fingers such as 28 may pivot relative to the body member 18 about a pivotal axis transverse to the longitudinal axis 16 of the body member 18.

The adjustable collet positioning means 46 is rotatable about the longitudinal axis 16 of body member 18 relative to the first ends such as 48 of the collet fingers 22-34, as is further described below.

The body member 18 has an externally threaded surface 50 defined thereon.

The adjustable collet positioning means 46 includes an adjusting nut 52 threadedly engaged with the externally threaded surface 50 of body member 18 and having an external annular groove 54 disposed therein.

Adjustable collet positioning means 46 further includes a support ring 56 concentrically disposed about the adjusting nut 52 and having a downwardly depending annular skirt 58 partially covering the annular groove 54 of adjusting nut 52.

The annular groove 54, as partially covered by the skirt 58, may also be described as a partially open annular cavity 54 of the adjustable collet positioning means 46.

Each of the collet fingers such as 28 has at its upper first end 48 a radially inward extending pivot lug 60 trapped within the partially open annular cavity 54 of the adjustable collet positioning means 46, so that rotation of the adjustable collet positioning means 46 about the longitudinal axis 16 of body member 18 relative to the first ends 48 of the collet fingers such as 28 is permitted by a circumferential sliding of the pivot lug 60 within the annular cavity 54.

The pivot lug 60 as seen in FIGS. 1 and 2 is substantially L-shaped in vertical cross section, having a radially inward extending portion 62 and having a vertically upward extending portion 64.

The lug 60 is not tightly received within the annular cavity 54, but rather is somewhat loosely received due to a plurality of clearances adjacent tapered surface 66 and above the upper surfaces 68 and 70.

With reference to FIG. 1, the collet finger 28 will pivot counterclockwise about its upper end 48 to the open position thereof as seen in FIG. 2 due to the clearances created by surfaces 66, 68 and 70. The surfaces 66 and 68 are on the radially inner and the upward facing surfaces of lug 60, respectively. Surface 70 is an upward facing surface of the radially inward extending portion 62 of the lug 60. The angle on the tapered surface 66, corresponds to the angular movement of collet section 28 between FIGS. 1 and 2, and preferably is approximately 2°.

As seen in FIG. 2, when the collet finger 28 is in its open position, the clearances created by surfaces 66, 68 and 70 are substantially closed and a new clearance is created at 72 (see FIG. 2) between a cylindrical outer surface 74 of adjusting nut 52 and a radially inner annular groove 76 of the collet fingers 22-34 of collet means 20.

The support ring 56 provides an additional function due to its engagement in the closed position of FIG. 1 with radially outer surfaces such as 78 of the upward extending portion 64 of the pivot lugs such as 60, for supporting the pivot lugs 60 against bending forces created due to tension loading of the collet fingers such as 28.

This can best be understood with regard to the schematic illustration of FIG. 5.

When the coupling apparatus 10 is connected to the well casing 12 and casing collar 14 as shown in FIG. 1, the internal pressures within the well casing 12 act to push the body member 18 longitudinally upward away from the well casing 12. These forces are generally carried in tension by the collet fingers 22-34, and this tension loading is represented by the arrow 80 in FIG. 5.

The vertical force represented by the arrow 80 is counteracted by an upward force represented by the arrow 82 which is applied to the lug 60 by an upward facing surface 84 of adjusting nut 52.

If it were not for the support ring 56, the radial offset between the forces represented by arrows 80 and 82 would apply a substantial bending moment to the radially inward extending lug 60.

The support ring 56, however, engages the radially outer surface 78 of the lugs 60 thus exerting a radially inward force thereon as represented by the arrow 86 to offset the couple between the forces represented by arrows 80 and 82.

The adjustable collet positioning means 46 further includes a lock ring 88 threadedly engaged with external threaded surface 50 of body member 18 for locking the adjusting nut 52 in place relative to the body member 18.

The adjusting nut 52 is shown in section elevation view in FIG. 3, and as there seen it has a castled upper end including a plurality of upwardly extending arcuate portions such as 90, 92 and 94.

Adjustable collet positioning means 46 also includes a hammer ring 96 which has a plurality of radially inward extending lugs such as 98 which are located between the upward extending portions such as 90, 92 and 94 of the castled upper end of adjusting nut 52, so that adjusting nut 52 is rotated relative to the body member 18 by rotating the hammer ring 96.

The hammer ring 96 is connected to the adjusting nut 52 by a plurality of dog-point set screws 97 (see FIG. 2) which have ends 99 received in an annular groove 101 of adjusting nut 52.

As seen in FIG. 1, hammer ring 96 includes a plurality of radially outward extending hammer lugs such as 100 and 102 which may be impacted with a hammer or other tool to rotate the hammer ring 96 and the adjusting nut 52.

The actuating means 40 of coupling apparatus 10 includes an actuating sleeve 104 slidably disposed about the lower ends of the collet fingers 22-34.

The actuating sleeve 104 includes a closing cam means 106 operably associated with collet fingers 22-34 for moving the collet fingers 22-34 to their radially contracted closed position upon sliding movement of the actuating sleeve in an upward direction relative to the collet fingers 22-34 to a closed position of the actuating sleeve 104 as seen in FIG. 1.

Actuating sleeve 104 also includes an opening cam means 108 operably associated with the collet fingers 22-34 for moving the collet fingers 22-34 to their radially expanded open position as seen in FIG. 2 upon sliding movement of the actuating sleeve 104 in a downward direction to its open position as illustrated in FIG. 2.

The closing cam means 106 is a radially inner tapered surface adjacent an upper end 110 of actuating sleeve 104. As the actuating sleeve 104 is moved upward from the position illustrated in FIG. 2, the closing cam means 106 engages a radially outer collet cam surface 112 of each of the collet fingers such as 28. This cams the lower ends of the collet fingers such as 28 radially inward as the actuating sleeve 104 moves upward, thus moving the flanges such as 36 inward to a position below the downward facing surface 38 of the casing collar 14.

The actuating sleeve 104 includes an upper cylindrical portion 114, a middle frusto-conical portion 116, a lower cylindrical portion 118, and a lowermost radially inward directed annular flange 120.

After the lower ends of the collet fingers 22-34 are cammed completely inward, the actuating sleeve 104 continues to move upward until its upper cylindrical portion 114 is received about an arcuate radially outer surface such as 122 of each of the collet fingers such as 28, with its upper end 110 abutting downward facing ledges such as 124 of each of the collet fingers such as 28.

When the actuating sleeve 104 is in this uppermost position, a radially inner tapered surface 126 thereof closely engages the collet cam surfaces such as 112. The lower cylindrical portion 118 is closely received about an outer vertical arcuate surface 126 of each of the collet fingers such as 28, with the lower inwardly directed flange 120 being closely received within a radially outer groove such as 128 of each of the collet fingers such as 28.

The lower flange 120 of actuating sleeve 104 functions as a support ring with regard to the lower flanges 36 of the collet fingers 22-34 in order to prevent bending of those lower flanges 36, in much the same manner as the support ring 56 functions to prevent bending of the pivot lug 60 as previously described with regard to FIG. 5.

Each of the collet fingers such as 28 has a cam follower member 130 extending radially outward from a lower end thereof. Each of the cam follower members 130 includes a shank or lug 132 which is threadedly connected to the collet fingers such as 28 and which extends through one of a plurality of L-shaped slots 134 of actuating sleeve 104. Each follower member 130 also includes a head 136 on the radially outer end of shank 132, with the head 136 being wider than a width of the L-shaped slot 134. A cam follower surface 138 is defined on the radially inner end of each of the heads 136.

When the actuating sleeve 104 is moved downward from its closed position as illustrated in FIG. 1, the opening cam means 108, which is a radially outer downwardly tapered frusto-conical surface of actuating sleeve 104, engages each of the cam follower surfaces 138 of each of the cam follower members 130 and cams the lower ends of each of the collet fingers such as 28 radially outward to their open position as illustrated in FIG. 2.

A manually engagable lifting ring 140 is concentrically disposed about the actuating sleeve 104 and is rigidly connected thereto by a plurality of spokes 142.

The actuating sleeve 104 is designed to be moved up and down between its closed and open positions as illustrated in FIGS. 1 and 2 by a single human operator grasping the lifting ring and pulling it upwardly or downwardly.

The L-shaped slots 134 of apparatus 10 may further be defined as a portion of a releasable locking means 144 for releasably locking the actuating sleeve 104 in its closed position.

The releasable locking means 144 includes the L-shaped slots 134 and a latch means 146 for releasably latching the actuating sleeve 104 to the collet means 20 to prevent rotation therebetween about the longitudinal axis 16 of the body member 18.

Each of the L-shaped slots 134 has a longitudinal portion 148 and a transverse portion 150.

To lock the actuating sleeve in its closed position, the actuating sleeve 104 is moved upward until its upper end 110 abuts the downward facing ledge 124 of the collet fingers such as 28, as illustrated in FIG. 1. This places the shanks 132 of the follower members 130 at the lower extremity of the longitudinal portions 148, and aligns them with the transverse portion 150 of the L-shaped slot 134.

Then, the actuating sleeve 104 is rotated clockwise as viewed from above to move the shanks 132 of cam follower members 130 into the transverse portions 150 of L-shaped slots 134. This aligns a spring-loaded plunger 146 with a longitudinal space such as 152 between two adjacent collet fingers such as 24 and 26.

Each of the collet fingers such as collet finger 24 has a pair of longitudinally spaced cap screws 154 and 156 threadedly engaged with one of its flat vertical sides, so as to maintain the spacing 152 between adjacent collet fingers such as 24 and 26.

The manner of construction of the latch means 146 is very schematically illustrated in FIG. 6 which is a schematic section view taken along line 6—6 of FIG. 1.

The latch means 146 includes a plunger 158 which is biased radially inward by a coil compression spring 160.

The annular seal means 42 of coupling apparatus 10 is best illustrated in the enlarged view of FIG. 4.

Annular seal means 42 includes an annular main seal 162 arranged for sealing engagement with the upper end surface 44 of casing collar 14.

Annular seal means 42 further includes a hydraulically biased seal carrier means 164 for maintaining a compression of the annular main seal 162 with the aid of hydraulic pressure within an inner cavity 166 of body member 18, in a manner that will be further described below.

Annular seal means 42 further includes a seal retainer ring 168 which is fixedly connected to the body member 18 by a plurality of dog-point set screws such as 170 which have ends 171 engaging a groove 173 in body member 18. Seal retainer ring 168 has an inner cylindrical bore 172 within which the seal carrier means 164 is slidably received. The inner bore 172 is spaced radially outward from the body member 18 so that the upper end of casing collar 14 may be received therebetween to engage the main seal means 162 as illustrated in FIG. 1.

The inner bore 172 of retainer ring 168 further is constructed to closely receive an outer cylindrical surface 174 (see FIG. 1) of casing collar 14 so as to support the casing collar 14 against radial expansion due to hydraulic pressures within a bore 176 of the casing 12.

The seal carrier means, as best shown in FIG. 4, has a substantially rectangular cross section, with a first annular groove 178 disposed in a radially inner edge portion of its lower end surface 180 and with a second annular groove 182 disposed in its radially outer cylindrical surface 184.

The annular main seal 162 is disposed in the first groove 178.

An annular sliding follower seal means 186 is disposed in the second groove 182 for sealing between the seal carrier means 164 and the inner bore 172 of seal retainer ring 168.

The seal retainer ring 168 includes an annular groove 188 joining its central bore 190 and the inner bore 172 previously described. An annular retainer seal means 192 is disposed in the groove 188 for sealing between the seal retainer ring 168 and the body member 18.

When the coupling apparatus 10 is first assembled with the well casing 12 and casing collar 14 as illustrated in FIG. 1, the collet means 20 will be raised relative to the body member 18 by the adjustable collet positioning means 46 so that the flanges 36 of the lower ends of the collet fingers such as 28 will be engaged with the lower end 38 of casing collar 14, and the lower end 180 of hydraulically biased seal carrier 164 will abut the upper end surface 44 of casing collar 14. An upper end 194 of seal carrier 164 will abut a downward facing surface 196 of seal retainer ring 168.

When the downward facing lower end 180 of hydraulically biased seal carrier 164 is engaged with the upper end surface 44 of casing collar 14, the main seal 162 is compressed between the seal carrier 164 and the upper end 44 of casing collar 14 to provide a seal therebetween.

As seen in FIG. 4, the main seal 162 includes an annular O-ring seal 198, which is concentrically disposed about an annular support ring 200 which holds O-ring 198 within groove 178.

The support ring 200 is of hard rubber construction, and is stretched like a rubber band around body member 18.

A plurality of longitudinal grooves such as 206 are cut in outer cylindrical surface 202 of body member 18 to assure that fluid pressure can bypass the support ring 200 of main seal means 162. That bypassing fluid also passes upward through the slight annular clearance between cylindrical outer surface 202 and a cylindrical inner surface 204 of seal carrier 164, to the upper end 170 of seal carrier 164.

The effective area over which the casing pressure acts in a downwardly direction on the seal carrier 164 is defined by the bore 172 due to the placement of the follower seal 186 which seals between the outside of carrier 164 and the bore 172 of retainer ring 168.

The effective area over which the casing pressure will act in an upward direction is defined by the radial width of the groove 178 in which the main seal 162 is received. The main seal 162, which will be compressed and which will be subject to the casing pressure, will in effect itself act as a fluid so that it pushes upward across the entire width of the groove 178 with essentially the same pressure as exists within the casing 12. The main seal 162, however, will prevent casing pressure from reaching the lower end 180 of seal carrier 164. Thus, the well casing pressure will act over a considerably greater area in a downward direction on seal carrier 164 than it will act in an upward direction, so that well casing pressure will bias the seal carrier 164 in a downward direction.

As the pressure within the well casing 12 is increased after the connector apparatus 10 is securely fastened to the well casing 12, that pressure will cause the collet fingers 22-34 to stretch slightly, so that the seal carrier 164 will no longer be tightly held between the downward facing surface 196 of retainer ring 168 and the upper end 44 of well casing 14. Instead, as the collet fingers 22-34 stretch slightly, the hydraulic biasing effect just described will cause the seal carrier 164 to slide downwardly within bore 172 so that a metal-to-metal contact is maintained between the lower end 180 of seal carrier 164 and the upper end surface 44 of well casing 14, thus maintaining the annular main seal means 162 in compression between the seal carrier 164 and the casing collar 14.

SUMMARY OF THE OPERATION OF THE INVENTION

The manner of use of the apparatus 10 will now be summarized.

Prior to placing the coupling apparatus 10 upon the well casing 12 and casing collar 14, the adjusting nut 52 of adjustable collet positioning means 46 will be rotated to a downward position relative to body member 18 so as to provide a sufficient spacing between the main seal means 162 and the radially inward extending flanges 36 of collet means 20 to allow the casing collar 14 to be received therebetween.

Then, with the coupling apparatus 10 and any associated equipment that may be attached to the body member 18 assembled together, and with the coupling apparatus 10 in its open position as shown in FIG. 2, the apparatus 10 will be lowered into position on top of the casing collar 14 with the main seal means 162 engaging the upper end surface 44 of casing collar 14.

This will typically be done with hoisting equipment of some type due to the size and weight of the coupling apparatus 10 and the attached equipment. Depending upon the weight of the equipment attached to the coupling apparatus 10, the main seal means 162 may not initially be completely compressed so as to achieve metal-to-metal contact between lower end 180 of seal carrier 164 and the upper end 44 of casing collar 14.

Then, the lifting ring 140 is manually gripped by a human operator who will lift the lifting ring 140 and attached actuating sleeve 104 relative to the collet means 20 so as to cam the lower ends of the collet fingers 22-34 radially inward so that the flanges 36 thereof are in a position below the lower end 38 of casing collar 14. Then, the lifting ring 140 and attached actuating sleeve 104 will be rotated clockwise as viewed from above to move the shanks 132 of cam follower members 130 into the transverse portions 150 of the L-shaped slots 134, and also the plunger 158 of releasable latch means 146 will be engaged with the longitudinal space 152 between collet fingers 24 and 26 to releasably latch the actuating sleeve 104 in its closed position.

Then, the adjusting nut 52 is rotated, first hand-tight and then by hammering on the lugs such as 100 and 102 of hammer ring 96, to move the collet fingers 22-34 of collet means 20 upward relative to body member 18 so that the flanges 36 of collet fingers 22-34 engage the lower end 38 of casing collar 14.

The adjusting nut 52 is further rotated until the main seal means 162 is completely compressed so that there is metal-to-metal contact between the lower end 180 of seal carrier 164 and the upper end 44 of casing collar 14. There will also be metal-to-metal contact between the upper end 194 of seal carrier 164 and the downward facing surface 196 of retainer ring 168. Then the lock ring 88 is tightened.

At this point, prior to pressurizing the well casing 12, the main seal means 162 will seal between the seal carrier 164 and the casing collar 14.

The follower seal 186 seals between the seal carrier 164 and the retainer ring 168.

The retainer seal 192 seals between the body member 18 and the seal retainer ring 168.

As the pressure within well casing 12 is increased, the tension load in the collet fingers 22-34 will increase and those collet fingers 22-34 will stretch slightly. When this occurs, the downward hydraulic bias on seal carrier 164 will cause the seal carrier 164 to move downward relative to the bore 172 of seal retainer ring 168 so as to maintain a metal-to-metal contact between the lower end 180 of seal carrier 164 and the upper end 44 of casing collar 14.

When it is desired to remove the coupling apparatus 10 from the well casing 12, the lock ring 88 and adjusting nut 52 are loosened and then a human operator retracts plunger 158 of latch means 146 from longitudinal space 152 and manually grips the lifting ring 140, rotates it counterclockwise as viewed from above to move the shanks 132 of cam follower members 130 into the lower ends of longitudinal portions 148 of L-shaped slots 134, and then the lifting ring 140 and attached actuating sleeve 104 are manually pulled downward relative to the collet means 20, and the opening cam means 108 engages the cam follower surfaces 138 of cam follower members 130 to cam the lower ends of collet fingers 22-34 outward to their open position as illustrated in FIG. 2.

Then, the coupling apparatus 10 may be removed from the well casing 12.

Thus it is seen that the apparatus and methods of the present invention readily achieve the ends and advantages mentioned as well as those inherent therein. While certain preferred embodiments of the invention have been illustrated for the purposes of the present disclosure, numerous changes in the arrangement and construction of parts and steps may be made by those skilled in the art, which changes are encompassed within the scope and spirit of the present invention as defined by the appended claims.

What is claimed is:

1. A coupling apparatus for connection to a cylindrical member having a radially outward extending shoulder, said coupling apparatus comprising:
   a body member;
   a collet means including a plurality of collet fingers disposed around said body member, each of said collet fingers including a radially inward extending flange adapted to engage a longitudinally inward facing surface of said shoulder of said cylindrical member;
   an actuating means, operably associated with said collet means, for moving said flanges of said collet fingers between a radially expanded open position and a radially contracted closed position;
   annular seal means for sealing between said body member and said cylindrical member; and
   adjustable collet positioning means, operably associated with said body member and said collet means, for adjusting a longitudinal position of said flanges of said collet fingers relative to said body member.

2. The apparatus of claim 1, wherein:
   said collet fingers each have a first end pivotally connected to said adjustable collet positioning means so that each of said collet fingers may pivot relative to said body member about a pivotal axis transverse to a longitudinal axis of said body member.

3. The apparatus of claim 2, wherein:
   said adjustable collet positioning means is rotatable, about said longitudinal axis of said body member, relative to said first ends of said collet fingers.

4. The apparatus of claim 3, wherein:
   said first end of each of said collet fingers includes a radially inward extending pivot lug trapped within a partially open annular cavity of said adjustable collet positioning means, so that rotation of said adjustable collet positioning means about said longitudinal axis of said body member relative to said first ends of said collet fingers is permitted by a circumferential sliding of said pivot lugs within said annular cavity.

5. The apparatus of claim 2, wherein:
   said first end of each of said collet fingers includes a radially inward extending pivot lug trapped within a partially open annular cavity of said adjustable collet positioning means, said pivotal movement of each of said collet fingers relative to said body member about said pivotal axis being permitted by clearances between said pivot lug and said annular cavity.

6. The apparatus of claim 2, wherein:
   said first end of each of said collet fingers includes a radially inward extending pivot lug trapped within a partially open annular cavity of said adjustable collet positioning means; and
   said adjustable collet positioning means includes an annular support ring means which partially defines said partially open annular cavity and which engages a radially outer surface of each of said pivot lugs, for supporting said pivot lugs against bending forces created due to tension loading of said collet fingers.

7. The apparatus of claim 2, wherein:
   said actuating means includes an actuating sleeve slidably disposed about second ends of said collet fingers, said actuating sleeve including:
      closing cam means, operably associated with said collet fingers, for moving said collet fingers to their radially contracted closed position upon sliding movement of said actuating sleeve in a first longitudinal direction relative to said collet fingers to a closed position of said actuating sleeve; and
      opening cam means, operably associated with said collet fingers, for moving said collet fingers to their radially expanded open position upon sliding movement of said actuating sleeve in a second longitudinal direction opposite said first longitudinal direction to an open position of said actuating sleeve.

8. The apparatus of claim 7, further comprising:
releasable locking means, operably associated with said actuating means, for releasably locking said actuating sleeve in its said closed position.

9. The apparatus of claim 8, wherein said releasable locking means includes:
a slot disposed through said actuating sleeve and having a radially outward extending lug of one of said collet fingers received therein, said slot having a longitudinal portion and a transverse portion, said lug being aligned with said transverse portion of said slot when said actuating sleeve is in its said closed position; and
latch means for releasably latching said actuating sleeve to said collet means to prevent rotation therebetween about said longitudinal axis of said body member.

10. The apparatus of claim 9, wherein:
said latch means is a plunger constructed to be received within a longitudinal space between two adjacent collet fingers.

11. The apparatus of claim 1, wherein said annular seal means comprises:
an annular main seal arranged for sealing engagement with a longitudinally outward facing surface of said cylindrical member; and
hydraulically biased seal carrier means for maintaining a compression of said annular main seal with the aid of hydraulic pressure within an inner cavity of said body member.

12. The apparatus of claim 11, wherein said annular seal means further comprises:
a seal retainer ring fixedly connected to said body member and having said seal carrier means slidably received in an inner bore of said seal retainer ring, said inner bore of said seal retainer ring being spaced radially outward from said body member so that an end of said cylindrical member may be received therebetween to engage said main seal.

13. The apparatus of claim 12, wherein:
said inner bore of said seal retainer ring is constructed to closely receive an outer cylindrical surface of said end of said cylindrical member so as to support said cylindrical member against radial expansion due to hydraulic pressure within said cylindrical member.

14. The apparatus of claim 12, wherein said annular seal means further comprises:
an annular retainer seal means for sealing between said seal retainer ring and said body member; and
an annular sliding follower seal means for sealing between said seal carrier means and said inner bore of said seal retainer ring.

15. The apparatus of claim 11, wherein:
said seal carrier means has a longitudinally inward facing surface which has an annular groove disposed therein; and
said annular mean seal is disposed in said annular groove of said seal carrier means and is constructed to provide a compression seal against said longitudinally outward facing surface of said cylindrical member when said longitudinally inward facing surface of said seal carrier means is in contact with said longitudinally outward facing surface of said cylindrical member.

16. The apparatus of claim 1, wherein:
said adjustable collet positioning means includes an internally threaded adjusting nut which is threadably engaged with an externally threaded surface of said body member, so that the longitudinal position of said flanges of said collet fingers relative to said body member is adjusted by rotating said adjusting nut relative to said body member.

17. The apparatus of claim 1, further comprising:
an annular thread protector sleeve means, connected to said body member and arranged to be concentrically and closely received within a threaded internal surface of said cylindrical member when said coupling apparatus is connected to said cylindrical member, for protecting said threaded internal surface against physical impact.

18. A coupling apparatus for connection to a cylindrical casing collar of a well casing, said coupling apparatus comprising:
a body member having an externally threaded surface;
an adjusting nut threadedly engaged with said externally threaded surface of said body member, and having an external annular groove disposed therein;
a support ring concentrically disposed about said adjusting nut and having a downwardly depending annular skirt partially covering said annular groove of said adjusting nut;
a plurality of collet fingers disposed around said adjusting nut, each of said collet fingers including:
a pivot lug extending radially inward from an upper end thereof, said pivot lug being trapped within said annular groove of said adjusting nut by said skirt of said support ring; and
a flange extending radially inward from a lower end thereof for engaging a downward facing annular surface of said casing collar;
an actuating sleeve slidably disposed about said lower ends of said collet fingers, said actuating sleeve including:
opening cam means for radially expanding said lower ends of said collet fingers when said actuating sleeve is longitudinally moved to a first position relative to said collet fingers; and
closing cam means for radially contracting said lower ends of said collet fingers when said actuating sleeve is longitudinally moved to a second position relative to said collet fingers;
a seal retainer ring fixedly connected to said body member and having a cylindrical inner bore for closely receiving an outer cylindrical surface of said casing collar therein;
a hydraulically biased seal carrier slidably received in said inner bore of said seal retainer ring; and
a main seal means connected to said seal carrier for sealing against an upward facing annular surface of said casing collar.

19. A method of connecting a coupling to a cylindrical member having a radially outward extending shoulder, said coupling including a body member, a collet means having a plurality of collet sections disposed about the body member, an actuating means operably associated with the collet means, annular seal means for sealing between the body member and the cylindrical member, and adjustable collet positioning means, said method comprising the steps of:

(a) manually moving an actuating sleeve of said actuating means longitudinally in a first direction relative to said collet means to an open position of said actuating sleeve; thereby (b) radially expanding said collet fingers of said collet means so that said shoulder of said cylindrical member may be received between said collet fingers;

(c) receiving said shoulder of said cylindrical member between said collet fingers;

(d) manually moving said actuating sleeve longitudinally in a second direction opposite said first direction, from said open position to a closed position of said operating sleeve; thereby (e) radially contracting said collet fingers of said collet means so that said shoulder of said cylindrical member is trapped longitudinally between said annular seal means and radially inward extending flanges of said collet fingers;

(f) locking said actuating sleeve in its said closed position;

(g) adjusting said adjustable collet positioning means to shorten a longitudinal distance between said annular seal means and said flanges of said collet fingers; and thereby (h) compressing said annular seal means against said cylindrical member.

20. The method of claim 19, further comprising the step of:

hydraulically biasing said annular seal means against said cylindrical member so that said annular seal means remains compressed against said cylindrical member even when said collet fingers stretch due to internal hydraulic pressure within said cylindrical member and said body member.

* * * * *